(12) United States Patent
King, Jr. et al.

(10) Patent No.: US 8,579,296 B2
(45) Date of Patent: Nov. 12, 2013

(54) WATER SYSTEMS

(75) Inventors: Lloyd Herbert King, Jr., Chesterfield, MO (US); James C. Keeven, O'Fallon, MO (US); Steven Rhea, St. Peters, MO (US); David Kreutz, Saint Louis, MO (US); Mathew Walters, Kirkwood, MO (US)

(73) Assignee: The Patent Store LLC, O'Fallon, MO (US)

( * ) Notice: Subject to any disclaimer, the term of this patent is extended or adjusted under 35 U.S.C. 154(b) by 585 days.

(21) Appl. No.: 12/384,700

(22) Filed: Apr. 8, 2009

(65) Prior Publication Data

US 2009/0230627 A1 Sep. 17, 2009

Related U.S. Application Data

(63) Continuation-in-part of application No. 12/228,962, filed on Aug. 18, 2008.

(60) Provisional application No. 60/965,612, filed on Aug. 21, 2007.

(51) Int. Cl.
*F16L 17/00* (2006.01)

(52) U.S. Cl.
USPC .......................................... 277/314; 277/609

(58) Field of Classification Search
USPC .................. 277/314, 606, 609, 616
See application file for complete search history.

(56) References Cited

U.S. PATENT DOCUMENTS

| | | | | |
|---|---|---|---|---|
| 2,452,276 A * | 10/1948 | Woodling | ...................... | 277/622 |
| 3,124,502 A * | 3/1964 | Radke | .......................... | 428/66.4 |
| 3,402,731 A * | 9/1968 | Martin | .......................... | 137/375 |
| 3,784,235 A * | 1/1974 | Kessler et al. | .................. | 285/94 |
| 4,103,943 A * | 8/1978 | Curtin | .......................... | 285/419 |
| 4,281,856 A * | 8/1981 | Litman et al. | ................... | 285/15 |
| 4,429,907 A * | 2/1984 | Timmons | ....................... | 285/373 |
| 4,521,037 A * | 6/1985 | Knox | .............................. | 285/15 |
| 4,600,222 A * | 7/1986 | Appling | ..................... | 285/288.1 |
| 4,804,210 A * | 2/1989 | Hancock | ......................... | 285/47 |
| 5,358,283 A * | 10/1994 | Silva | .............................. | 285/24 |
| 5,449,207 A * | 9/1995 | Hockett | ..................... | 285/286.2 |
| 5,823,581 A * | 10/1998 | Coppolo | ....................... | 285/373 |
| 5,971,443 A * | 10/1999 | Noel et al. | ....................... | 285/94 |
| 6,022,054 A * | 2/2000 | Hemphill et al. | ............. | 285/398 |
| 6,318,761 B1 * | 11/2001 | Robertson | ....................... | 285/31 |
| 6,494,501 B2 * | 12/2002 | Gotoh | ............................ | 285/371 |
| 7,350,828 B2 * | 4/2008 | Williams | ...................... | 285/245 |

* cited by examiner

*Primary Examiner* — Vishal Patel
(74) *Attorney, Agent, or Firm* — Jacobson & Johnson LLC

(57) ABSTRACT

A sealing member and a preemptive system and a preemptive method of preventing or stopping a primary joint leak between a pipe and a pipe fitting by securing a sealing ring to the pipe and the pipe fitting to form a secondary joint that inhibits or prevent leakage between the primary joint between the pipe and the pipe fitting without knowing if the primary joint is faulty.

8 Claims, 7 Drawing Sheets

WATER SYSTEMS

CROSS REFERENCE TO RELATED APPLICATIONS

This application is a continuation in part of U.S. patent application Ser. No. 12/228,962 filed Aug. 18, 2008 titled LEAKPROOF PIPE CONNECTIONS AND LEAKPROOFING PIPE CONNECTIONS which claims priority to provisional patent application Ser. No. 60/965,612 filed Aug. 21, 2007 titled LEAKPROOF PIPE CONNECTIONS AND LEAKPROOFING PIPE CONNECTIONS

FIELD OF THE INVENTION

This invention relates generally to repairing or enhancing water systems and, more specifically, to either post assembly fitting repair or preemptive fitting reinforcement in water supply systems such as irrigation systems and building water supply systems.

STATEMENT REGARDING FEDERALLY SPONSORED RESEARCH OR DEVELOPMENT

None

REFERENCE TO A MICROFICHE APPENDIX

None

BACKGROUND OF THE INVENTION

Water supply systems and particular underground irrigation systems are known in the art. Typically, an irrigation system includes a controller for turning the supply of water on or off, a check valve to prevent backflow and a set of sprinkler heads that connect to the water supply lines. The irrigation systems are designed to supply water at high pressure, which may be in excess of 150 psi, to the supply line and the sprinkler heads. Since the water in the irrigations systems is destined for delivery to the soil proximate the irrigation lines oftentimes small leaks at the fittings of the irrigation system may be ignored since it is time consuming and costly to cut out and replace leaking fittings. However, leaks in the underground irrigation system can cause unintended consequences since the leaks may cause a reduction in supply line pressure at the sprinkler valves thereby reducing the range of the sprinkler valves. In addition, leaks may cause soil erosion as well as over watering regions around the leak.

While proper installation of a system requires checking the underground lines for leaks prior to covering the underground lines not all the joint leaks around fittings may be detected. For example, the placement of soil around the irrigation pipes and the fittings may cause sufficient disturbance of the irrigation pipe with respect to the fitting so that secondary leakage may occur at one or more of the joints between the fittings and the underground irrigation pipe. The condition of secondary leaks is more likely to occur if the joint between the underground irrigation pipe and the fitting has not been properly formed, however, it may not be detected until stress is placed on the joint. To minimize or eliminate the problem of secondary irrigation leakage the irrigation system fittings may be leakproofed or reinforced during the installing process and prior to burial of the irrigation lines by securing a closed or split sealing ring proximate each of the fittings in the irrigation system. These type of secondary leaks may be more likely to occur if the fill soil contains rocks or other hard objects.

In other cases underground irrigation lines may be buried without checking for leaks since the water or power necessary to operate the system is not available during the installation process. In these cases it also prudent to place a closed or split sealing ring proximate each of the joints between the underground irrigation lines and the fittings.

In still other cases the system may be tested by subjecting the system to high pressure after the irrigation pipes and sprinkler heads are operative. During the testing process leaks may be observed. These type of leaks may be repaired without replacing the fitting by using a split sealing ring that can be placed around the irrigation pipe and abutted to a fitting to form a leakproof seal of the pipe to the fitting.

Sealing irrigation pipes to fittings may be done through the method of solvent welding connectors to supply lines in irrigation systems. In solvent welding a thermoplastic polymer fitting, such as PVC, is coated with a thin layer of solvent that for a short time dissolves the surfaces of the polymer fitting creating a viscous liquid film on the surface of the fitting. While the surface of the polymer fitting is in the dissolved or liquid state it is joined to a surface of a polymer pipe that also has a thin layer of solvent thereon which also creates a viscous liquid film on the surface of the pipe. While both the surfaces of the polymer fittings have a thin viscous film the fittings are brought together and held in position. As the viscous film solidifies or cures it creates a solvent welded joint between the two fittings. If for some reason the film does not cover the entire shared surfaces between the pipe and the fitting a leak may occur causing erosion as well as reducing the supply line pressure and thus reducing the range of the irrigation system.

Another type of water system where secondary leaks may occur after the water pipes have been covered and concealed is in water pipes used in residential and commercial buildings where the water pipes may not be subjected to working pressures until after the water pipes have been concealed by walls, floors or ceilings. Oftentimes such leaks can be disastrous since it is not only the replacement of the leaking joint that is required but the secondary damage caused to walls, ceilings, floors and equipment. In those cases joint reinforcement through use of a sealing ring for each of the joints between the fittings and the pipes provides assurances that the chances of building or the building contents being damaged from water escaping from by a failed joint between a pipe and a fitting are substantially eliminated.

SUMMARY OF THE INVENTION

A sealing member and a low cost reinforced water system wherein the fittings in the water system are reinforced with sealing rings through a preemptive method of ensuring the integrity of a water supply system such as an irrigation system or a building supply system where the pipes are normally concealed from view comprising the steps of securing a fitting to a pipe to form a primary joint between the pipe and the fitting and securing a sealing ring to the pipe and to the fitting to form a secondary joint between the pipe and the fitting with the secondary joint being in series with the primary joint so that if a leak should occur in the primary joint the secondary joint would inhibit or prevent water leakage from the first joint as well as provide water conservation.

DESCRIPTION OF THE PREFERRED EMBODIMENT

In one mode the invention provides a leak proofing system for preventing or stopping joint leaks through a safety or sealing ring and a securement film, which may be a solvent welding film, so that the sealing ring may be solvent welded to both a pipe and a fitting. While the system is described with regard to using a securement film, which can be cured such as a solvent welding film, the leak proofing system is also well suited for fittings that are secured to each other than by solvent welding films, for example adhesives or the like. In another mode the invention includes a method of leak proofing by securing a pipe to a fitting through a first surface-to-surface joint that may or may not be leak proof and placing a sealing ring around an exterior cylindrical surface of the pipe and then securing the sealing ring to the pipe and the fitting to form a further surface-to-surface joint with the further surface-to-surface joint located proximate to the first surface-to-surface joint and in series therewith to thereby inhibit a leak through the first surface-to-surface joint.

Figure 1:
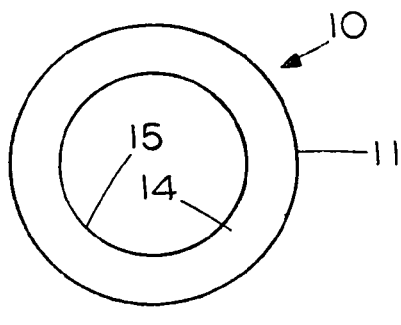
FIG. 1 is a front view of a one-piece closed sealing ring for leak proofing joints between members.

FIG. 1 shows a front view of an example of a one-piece leak proofing member such as a thermoplastic member comprising a PVC sealing ring or closed safety ring 10 for leak proofing a circumferential joint between thermoplastic members such as a PVC pipe and a PVC fitting. Sealing ring 10 includes an outer annular surface 11 and an inner pipe engagement surface 15 and an annular end face 14 for engaging the exterior end surface of a pipe fitting. In the embodiment shown an internal diameter of the sealing ring 14 and the internal diameter of fitting 30 are substantially equal. In addition, annular surface 15 and annular end face 14 are at a right angle or at substantial right angles to each other to permit annular end face 14 to abut against the end of a pipe fitting and to permit annular pipe engaging surface 15 to engage an exterior cylindrical surface of a pipe. The annular surfaces are shown at a right angle to each other so they can be mated with pipe surfaces and fittings that are also at right angles to each other. In some applications, the surfaces of the sealing ring may be at angles other than right angles as long as the sealing ring 10 can be seated to a pipe and a fitting where a leak may occur. In the example shown the annular surface 15 has a diameter sufficiently large so as to slide along an exterior pipe surface but sufficiently small so that a diametrical clearance between the exterior pipe surface and the annular surface 15 permits joining an exterior pipe surface and the annular surface to each other with a securement film present therebetween. Annular surface 15 of sealing ring 10 and annular surface 14 may include a film of solvent such as solvent 31$t$ to enhance securement of sealing ring 11 to pipe surface 31$a$ and fitting 30.

Figure 2:
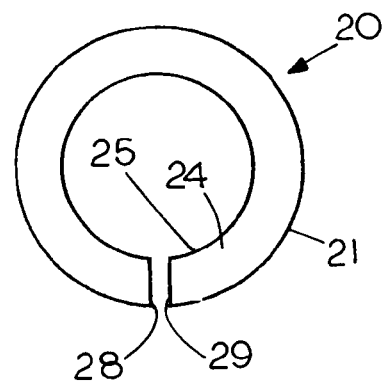
FIG. 2 is a front view of a one-piece, split sealing ring for leak proofing joints between thermoplastic members.

FIG. 2 is a front view of another example of a sealing ring comprising a one-piece split sealing ring 20 for leak proofing joints between members that have been previously joined together. Split-sealing ring 20 includes an outer annular surface 21, an annular pipe engaging surface 25 and an annular end face 24 that is perpendicular to annular surface 25. In the example shown annular end face 24 can abut against the end of a pipe fitting and annular surface 25 can engage the exterior cylindrical surface of a pipe. In some applications, the surfaces of the sealing ring 20 also may be at angles other than right angles as long as the sealing ring 20 can be seated to a pipe and a fitting where a leak may occur.

The split-sealing ring 20 allows one to place the sealing ring around a pipe without having to slide the sealing ring over the end of the pipe. That is, the split-sealing ring 20 retains sufficient flexibility so that the connectable end 28 and the connectable end 29, which can mateingly engage in an abutting relationship with each other to form a closed ring, that may be separated or spread apart to allow lateral insertion of the split-sealing ring 20 around a pipe with the ring having sufficient resiliency to return to its original end-to-end shape after the sealing ring is placed around the pipe. Thus, with the sealing ring 20 a user can laterally place the sealing ring around a pipe and seal a leak in a system without having to cut, remove and replace an existing leaking fitting and pipe since the split ring can be positioned next to a leaky fitting and secured to the pipe and the leaky fitting to thereby provide a secondary seal to inhibit or prevent leakage from a primary joint between the pipe and the fitting.

Figure 3:
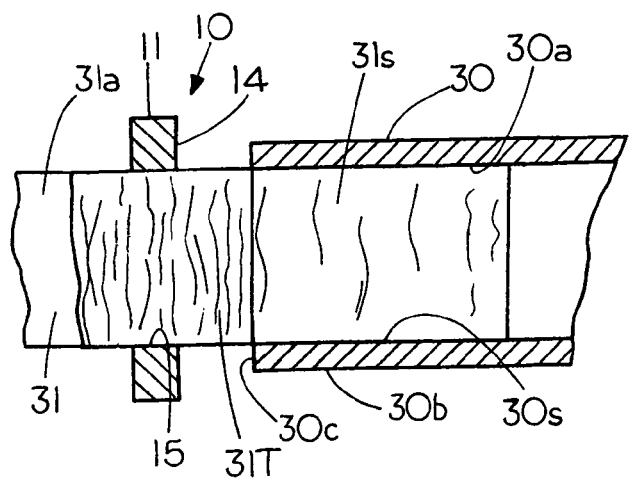
FIG. 3 is a sectional view of a thermoplastic pipe secured to a thermoplastic coupling with a sealing ring in an unsealed condition.
Figure 4:
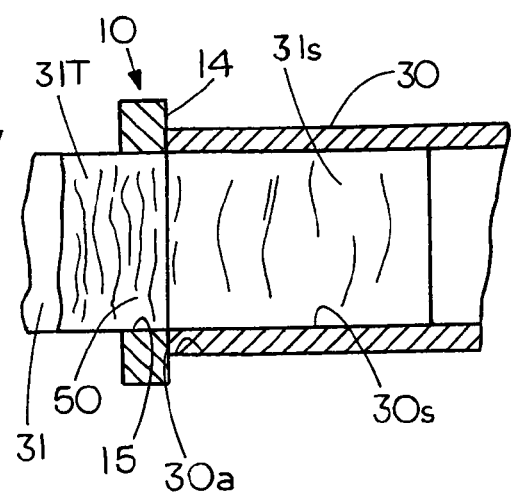
FIG. 4 is a sectional view of a thermoplastic pipe secured to a thermoplastic coupling with a sealing ring in a sealed condition.

FIG. 3 shows sealing ring 10 positioned around a pipe 31 and proximate a fitting 30 in an unsealed condition and FIG. 4 shows the sealing ring 10 having annular surface 14 of the sealing ring 10 abutting against the fitting 30 in a sealed condition to provide a leak proof seal/connection between fitting 30 and pipe 31. More specifically, FIG. 3 is a sectional view of a pipe coupling 30 and sealing ring 10, which is located on the exterior cylindrical surface 31$a$ of pipe 31, with sealing ring 10 in an unsealed condition and pipe 31 and pipe coupling 30 in a sealed condition. FIG. 3 shows a solvent film 31s, which can be applied by a brush or dauber, located on a portion of the exterior surface 31a of pipe 31. The cured solvent film 31s, which is located on the interior of fitting 30, secures pipe 31 to fitting 30. A second solvent film 31t, which can also be applied by a brush or dauber, is located on the portion of the exterior surface 31a of pipe 31 that extends outward from fitting 30. If the solvent welding of the annular outer surface 31a of pipe 31 to annular inner surface 30s of fitting 30 do not provide a leak proof seal between the pipe 31 and fitting 30, one can leak proof the connection therebetween with sealing ring 10 by securing the sealing ring 10 to the pipe 31 and fitting 30 so that when the solvent films 31t cures, it forms a secondary seal or welded joint between pipe 31, sealing ring 10 and fitting 30.

To appreciate the system of leak proofing a connection between pipe 31 and coupling 30 reference should be made to FIG. 3 and FIG. 4. FIG. 3 shows the sealing ring 10 prior to the sealing ring 10 being brought into a sealing condition and FIG. 4 shows the sealing ring 10 in a sealing condition with the sealing ring 10 positioned around the exterior of pipe 31 and secured to the pipe 31 and to the end of fitting 30 through solvent welding. Once cured, as illustrated in FIG. 4, the sealing ring 10 inhibits or prevents leakage in the primary joint between the pipe 31 and fitting 30 by providing a secondary joint between sealing ring 10 coupling 30 and pipe 31 which is in series with the primary joint.

In the example shown in FIG. 3, pipe 31 is secured to a fitting comprising a coupling 30 through a cured solvent film 31s. In order to prevent or stop a joint leak between pipe 31 and fitting 30 the sealing ring 10 can be secured to both pipe 31 and fitting 30. In leakproofing a joint between pipe 31 and fitting 30 one can apply a conventional securement film such as a solvent film 31t to the exterior surface 31a of pipe 31, which is located between sealing ring 10 and the end of fitting 30, annular surface 15, annular end face 14 of sealing ring 10 and to end face 30c of fitting 30. Typically, the solvent film 31t may extend at least partially over any exposed solvent film 31s which was used to secure pipe 31 to fitting 30 if the solvent 31s has dried on pipe 31.

While the solvent 31t is still in the viscous or flowable state the sealing ring 10, which is in the presence of solvent sealant 31t, is slid axially along pipe 31 and into engagement with the end of coupling 30 as illustrated in FIG. 4. The sealing ring 10 and coupling 30 are held in place until the film of solvent 31t solidifies thereby forming a second solvent weld, which secures the sealing ring 10 to both the pipe 31 and the end of the coupling 30. It is noted that in the example of FIG. 3 the second solvent welded joint between the sealing ring 10, pipe 31 and pipe coupling 30 forms a secondary joint, which is a barrier for fluid to escape threrethrough. Consequently, if a leak exists in a primary solvent welded joint between coupling 30 and pipe 31, the second welded joint between the sealing ring 10 and the pipe 31 and coupling 30 prevent or inhibit leakage therepast.

Even if the secondary joint should have a leak the odds of an alignment of a leak in the primary joint and the secondary joint are small so that the chances of a pipe leak occurring have been greatly diminished. While the preferred method is to allow the primary joint to cure before forming the secondary joint in some instances, one may want to secure both the primary and secondary joints at the same time.

In the preferred method of providing a secondary seal, the primary solvent welded joint is allowed to set or cure before the secondary solvent welded joint is formed. It should be pointed out that while the invention is described in regard to solvent welding other methods used to secure pipes to fittings or the like using adhesives, such as glue, can also be used to leak proof a joint through the use of sealing ring and an adhesive. In addition, the leak proofing can also be used with systems wherein the primary joint is formed by other methods such as sonic welding or the like and the secondary joint is formed through other methods including sonic welding, adhesives, solvents and the like.

Thus in one example the invention includes a method of leak proofing thermoplastic members such as pipe 31 and pipe coupling 30 by securing the thermoplastic pipe 31 to a thermoplastic fitting 30 through solvent welding to thereby form a first solvent secured joint therebetween that may or may not be leak proof. One can then place a sealing ring around an exterior cylindrical surface of the thermoplastic pipe 31 and apply a film of solvent to the exterior surface of the thermoplastic pipe and to an annular cylindrical surface and a cylindrical end face of a sealing ring. One can then bring the sealing ring 10 into engagement with the fitting 30 before the solvent has set. By holding the sealing ring 10 and the fitting 30 in position until the solvent sets or cures a further solvent secured joint is formed with the further solvent secured joint located in series with the first solvent secured joint.

Figure 5:
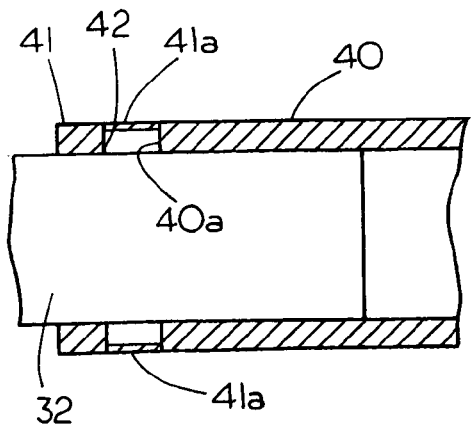
FIG. 5 is an alternate example of a sealing ring in an unsealed condition but secured to coupling by a runner.
Figure 6:
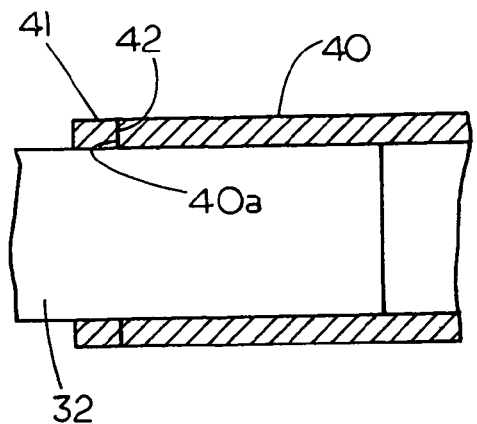
FIG. 6 shows the sealing ring of FIG. 5 secured to a thermoplastic pipe and a thermoplastic coupling to provide a leak proof seal between the thermoplastic pipe and the thermoplastic coupling.

FIG. 5 is yet another example of a sealing ring 41 in an unsealed condition, which is secured to coupling 40 by a ruptureable longitudinal extending runner or web 41a. In this example the pipe 32 the coupling 40 is located around pipe 32 and sealing ring 41 is not secured to pipe 32 but coupling 40 is secured to pipe 32. However, if a leak is discovered between coupling 40 and pipe 32 or if one wants to ensure that no leaks occur therebetween , the ruptureable runner 41a can be broken and a securement film positioned on pipe 32 so that the sealing ring 41 can be axially slid to the end of the fitting 40 as shown in FIG. 6. While the fitting 40 is shown with a sealing ring 41 having an annular surface 42 that extends radially outward and can abut surface 40a the annular surface 42 can be partly or wholly angled so that when the sealing ring 41 is brought proximate the end of the fitting 40 the solvent is forced into the junction between the pipe 32 and the fitting 40 to thereby form a bead of securement film around the exterior of the pipe 40.

FIG. 6 shows the sealing ring of FIG. 5 secured to both a pipe 32 and a coupling 40 to provide a secondary leak proof seal between the pipe 32 and the coupling 40. In this example the runner or web 41a, which holds the sealing ring proximate the coupling is ruptured or removed and the sealing ring 41 is then secured to the end of the fitting 40 and to the pipe 32 Thus, when the sealing ring 41 and the coupling 40 are in an end-to-end condition with the sealing ring secured to the pipe 32 one leak proofs the primary joint between pipe 32 and coupling 40.

Figure 7:
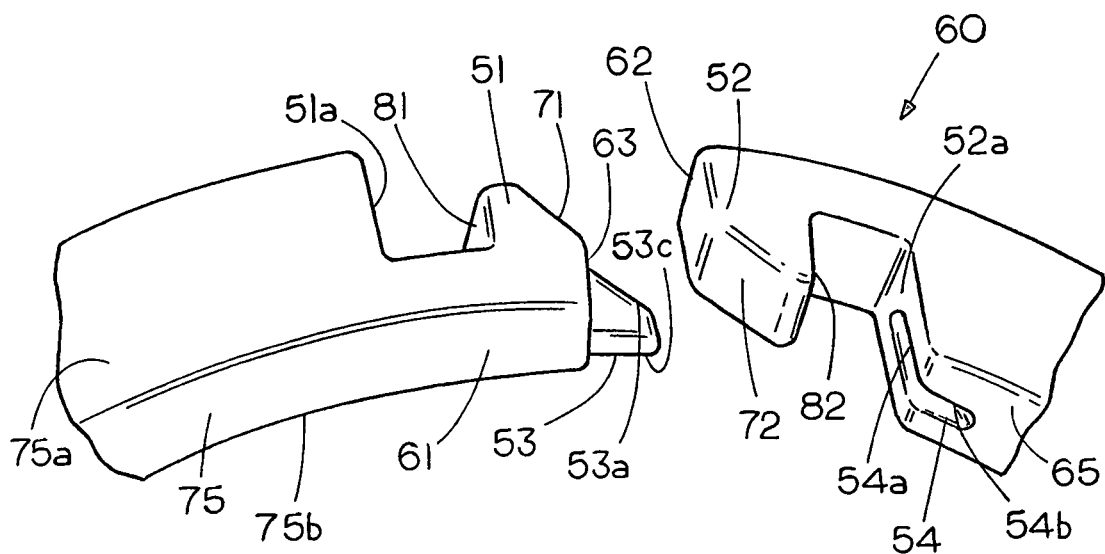
FIG. 7 is an example of connectable ends on a one-piece, split-sealing ring.
Figure 8:
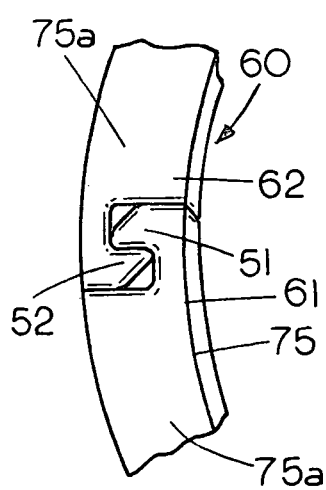
FIG. 8 is a partial side view of the connectable ends of FIG. 7 in an engaged condition.
Figure 9:
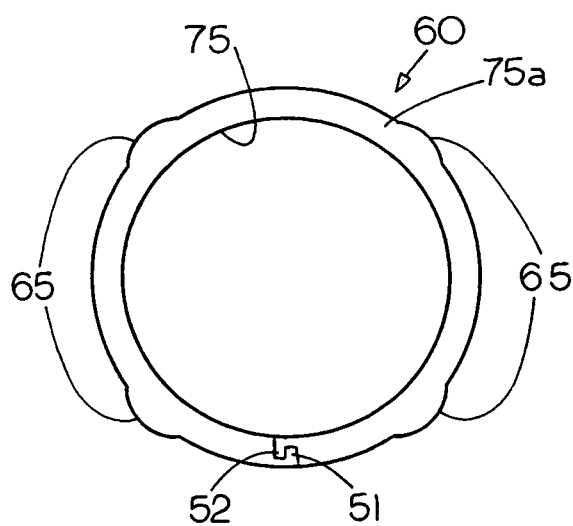
FIG. 9 is a front view of the sealing ring with hand grips.

FIG. 7-FIG. 9 show yet another example of a split sealing ring 60 having connectable ends 62 and 61 forming an end connector. The connectable ends 62 and 61 allow one to form sealing ring 60 into a closed ring for securing around a pipe. FIG. 7 shows the connectable ends 61 and 62 in an unengaged condition and FIG. 8 and FIG. 9 shows the connectable ends 61 and 62 in the connected condition for securing to a pipe and coupling to provide a leak proof seal between the pipe and coupling. Split-sealing ring 60 includes a hook 51 and a hook 52, which are shown in FIG. 7 as identical, however they need not be. Specifically, hook 51 and hook 52 are located on connectable ends 61 and 62, respectively. Hook 51 has an angled or canted face 81 and similarly hook 52 has an angled or canted face 82. Angled faces 81 and 82 prevent the hooks from slipping apart or separating since a circumferential force will draw the hooks toward each other. That is, when the hooks are mateingly engaged, face 81 of hook 51 and face 82 of hook 52 engage each other to prevents or inhibit separation of the connectable ends 61 and 62 of sealing ring 60. Although canted faces are shown other methods and means of maintaining the connectable ends in engagement with each other may be used.

Split-sealing ring 60 also includes a tab 53 and a groove 54 for laterally securing the connectable ends 61 and 62 of split-sealing ring 60. In the example shown both tab 53 and groove 54 are integral to split-sealing ring 60. As one engages hooks 51 and 52 with each other, tab 53 and groove 54 engage with each other to prevent lateral movement of the connectable ends of the sealing ring 60 with respect to each other. More specifically, tab 53 with sidewall 53*a* and 53*c* mateingly engage with groove sidewall 54*b* and groove sidewall 54*a*. It is noted that the width of side wall 54*a* and the width of groove wall 54*b* are sufficiently sized to allow tab 53 to be inserted into groove 54, preferably without the aid of tools. In the engaged condition, hook face 63 of hook 51 is proximate face 52*a* of hook 52 and hook face 62 is proximate face 51 a of hook 51.

It is noted that the hooks, tab and groove are just examples of connectors for mechanically securing the connectable ends of split-sealing ring 60 in order to prevent both longitudinal and lateral movement of the connectable ends with respect to each other. FIG. 7 shows sealing ring restraining members comprising a pair of hooks 51 and 52 that engage with each other to prevent longitudinal movement of sealing ring 60 and a tab 53 and groove 54 that engage with each other to prevent lateral movement of sealing ring 60. In some instances only one or the other (for example, a pair of hooks or tab and groove) may be used to secure the sealing ring 60 around a pipe or the like.

FIG. 8 shows the split-sealing ring 60 in an engaged condition with the connectable ends joined to each other. The split-sealing ring 60 like sealing ring 20 shown in FIG. 2, allows one to place the sealing ring 60 around a pipe without having to slide the sealing ring over the end of the pipe. That is, the split-sealing ring 60 retains sufficient flexibility so that the ends 61 and 62 can be separated to allow lateral insertion of the split-sealing ring 60 around a pipe with a leaky fitting or in some cases a pipe that may develop a leak and also has sufficient resiliency to return to its original circular shape after the sealing ring is placed around the pipe. Thus, with the sealing ring 60 a user can seal a leak in a system without having to cut, remove and replace the existing fitting and pipe since the split ring can be positioned next to a leaky fitting and secured to the pipe and the leaky fitting to provide a secondary seal to inhibit or prevent leakage from the primary joint between the pipe and the fitting.

FIG. 9 shows a front view of sealing ring 60 having a hand grip comprising four curved radial hand or finger gripping protrusions 65 that are spaced around the outer circumference of sealing ring 60. While four finger gripping regions are shown more or less may be used. The radial protrusion are finger friendly in that they allow a person to grasp and rotate the ring 60 as one axially slides the sealing ring into a sealing position proximate a fitting. That is, to position the sealing ring to prevent or stop a leak, the user may rotate the sealing ring around the pipe (not shown) with one hand while at the same time axially sliding the sealing ring toward a fitting with a leaky joint. The radial protrusions 65 may be smooth or contain axial groves to allow comfortable yet firm engagement of a user's fingers with the sealing ring 60 such that the user may rotate sealing ring 60 into a sealing condition against a pipe fitting. Radial protrusions 65 are also of sufficient height to provide ease of use for the user and also to ensure that the sealing ring with protrusions fits within the space wherein the sealing ring is used. While the handgrip is shown with radial protrusions the handgrip may also be formed with relief regions in the sealing ring 60.

FIG. 9 shows sealing ring 60 includes a chamfered or beveled edge 75*b* that extends around the inner 1 portion of sealing ring 60. In some applications a sealing ring with a chamfered edge 75*b* may be preferred since the chamfered edge 75*b* can distribute and force the sealant, which has been applied to the exterior of the pipe, between the exterior surface of the pipe and the inner cylindrical surface 75 of the sealing ring as the sealing ring is axially slid proximate a fitting that is to be waterproofed thus ensuring sealant between the pipe and the sealing ring. Although a chamfered edge with a straight bevel is shown other edge configurations for directing the sealant between the sealing ring and the pipe may be used.

Figure 9A:
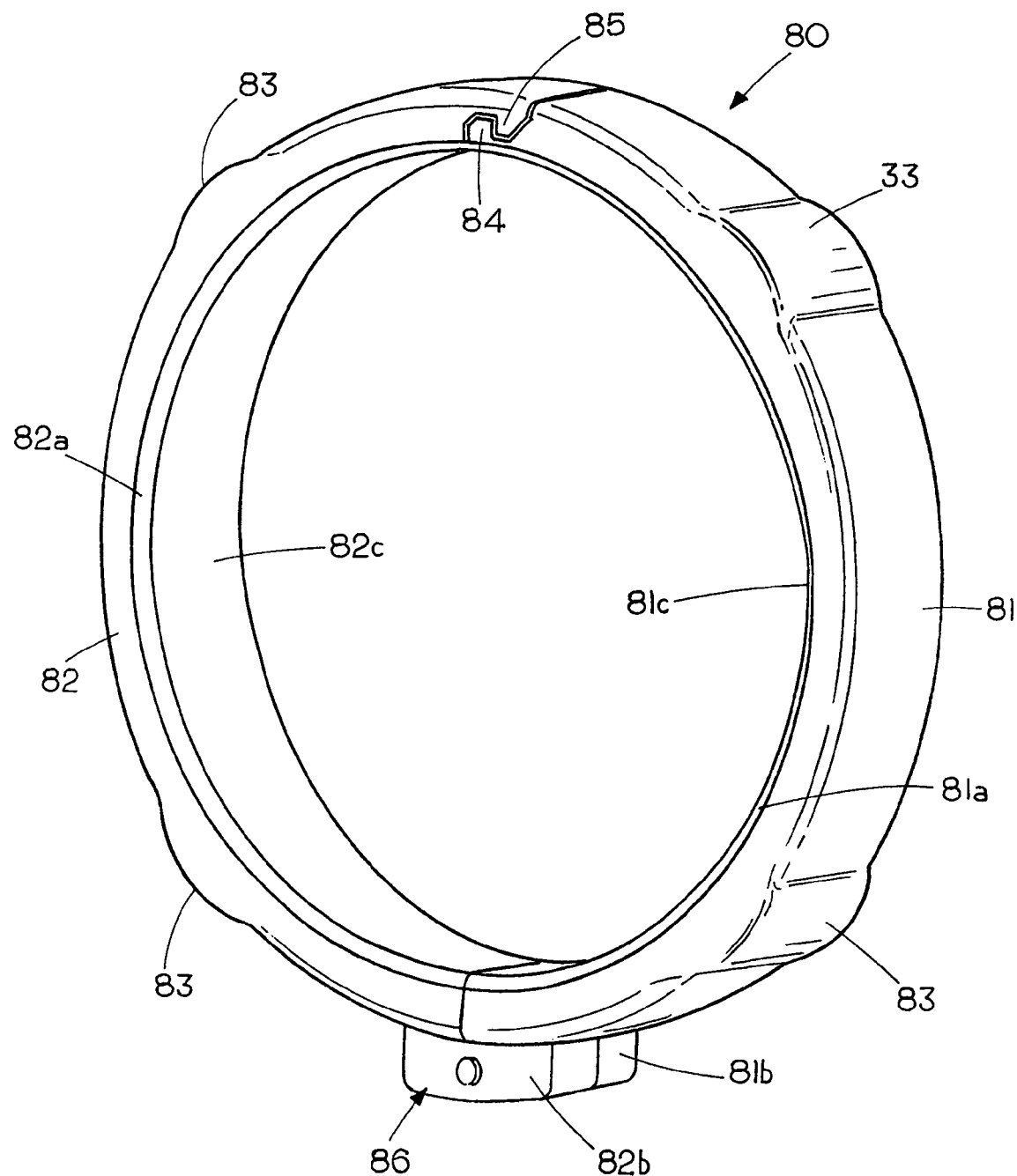
FIG. 9A is a perspective view of a hinged sealing ring with a chamfered edge.

FIG. 9A shows another embodiment of a two part sealing ring 80 comprising a first semi-cylindrical section 81 and a second semi-cylindrical section 82 with the end of section 81 and 82 joined by an integral end connector comprising a hinge 86 and at a diametrical opposite side of ring 80 by an end connector comprising a latch that includes a hook 84 on one end of semi-cylindrical section 81 and a hook 85 on one end of semi-cylindrical section 82. Hinge 86 comprises a radial extension 82*b* from section 82 and a radial extension 81*b* from section 81, which are secured to each other through a hinge pin 88 that extends through extension 82*b* and 81*b*. The purpose of hinge 86 is to facilitate the lateral placement of the sealing ring 90 around a pipe. That is, in some cases, such as smaller diameter pipes, a hinge may be preferred as it may be difficult to spread apart the ends of sealing ring sufficiently to laterally slip the sealing ring around a pipe since the material of the sealing ring may lack sufficient flexibility. A semi-cylindrical chamfer 82*a* on section 82 and a semi-cylindrical chamfer 81*a* on section 81 provide a continuous chamfered edge for guiding the sealant between the inner sealing ring surfaces 81*c* and 82*c*.

Figure 9B:
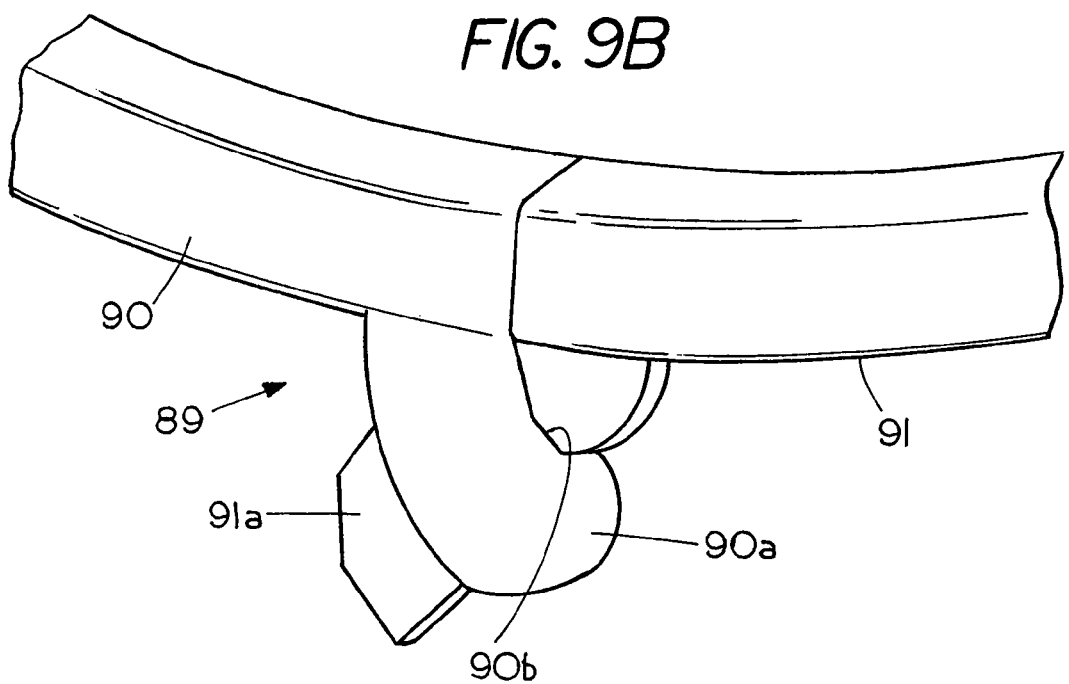
FIG. 9B is a partial side view of a hinged sealing ring.

FIG. 9B shows another example of an integral end connector comprising a hinge 89 which connects a semi-cylindrical sealing ring section 90 to a further semi-cylindrical sealing ring section 91 through a radial extension 91*a* on section 91 that mates with a hinge surface 90*b* in a radial extension 90*a* on section 90 to allow the sections 90 and 91 to be laterally placed around a pipe. Once the sections 90 and 91 are positioned circumferentially around the pipe the sections can be pivoted together and brought into circumferential engagement of the pipe through the hinged engagement of extension 91*a* with extension 90*a*.

Figure 9C:
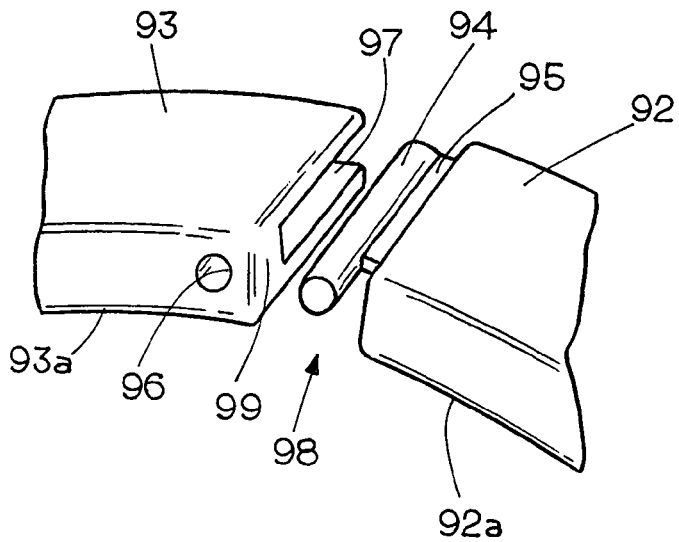
FIG. 9C is a partial side view of an embodiment of a hinged sealing ring.

FIG. 9C shows a further embodiment of a sealing ring end connector 98 that may function either as a latch or hinge. The end connector 98 includes two members, a female member on an end of section 93 comprising a slot 97, a web 99 and a cylindrical surface 96 and a male member on the end of section 92 with the male member comprising a cylindrical pin 94 that is held in a spaced condition from the end of section 92 by a web 95 located partially along an element of the pin 84. Web 95 extends partway across sealing ring section 92 so that when pin 94 is engagement with cylindrical surface 96 the web 99 acts as a stop as it engages web 99 to limit lateral displacement of section 92 with respect to section 91 as well as to laterally hold section 92 and 93 in an end-to-end section. Section 93 includes a chamfered edge 93*a* and section 92 similarly includes a chamfered edge 92*a* to facilitate the spreading of the sealant between the pipe and the sealing ring.

End connector 98 may function as a hinge to allow the spreading apart of section 92 and 93 to place the sealing ring around a pipe. In addition end connector 98 may function as a latch. A further advantege of end connector 98 is that if two end connectors are located on a two part sealing ring the two sections of the sealing ring can be placed around a pipe and then one of the sections slid into lateral engagement with the other section. Although sealing rings with two sections are shown sealing rings with more than two sections can be secured in an end-to-end condition with the end connector 98.

Figure 9D:
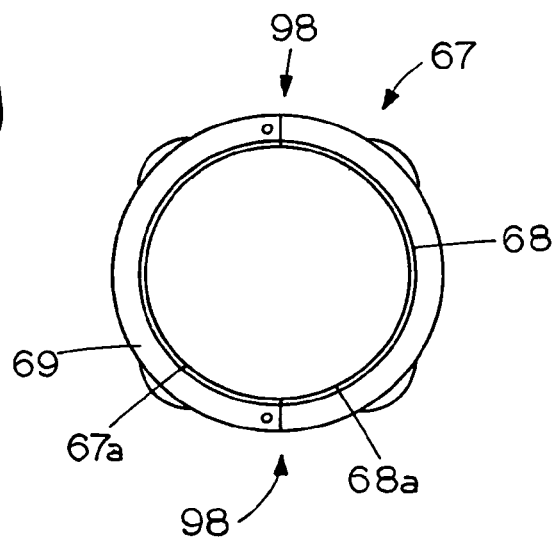
FIG. 9D is a front view of the sealing ring with connectable ends.

FIG. 9D shows an embodiment of the sealing ring that includes two sets of end connectors 98 for holding sealing ring section 68 proximate sealing ring section 69 to form a closed sealing ring 61. Sealing ring 61 also includes a chamfered edge 67a and a chamfered edge 68a to enhance the spreading of solvent as the sealing ring is axially slid proximate a fitting on a pipe.

While FIGS. 1-9 show a one-piece or split sealing ring, if desired the sealing ring could be comprised of more than one piece. For example, the use of two sets of connectable ends on a sealing ring would allow one to place one portion of a sealing ring around a pipe and then secure the other portion of the sealing ring to the one portion of the sealing ring.

Thus, in one embodiment the invention comprises a combination, namely a sealing ring having an annular sealing surface, a pipe and a pipe fitting having a joint therebetween that may or may not leak; and a securement film present on either the annular sealing surface or the pipe or both, with the sealing ring positionable along the pipe and into engagement with the pipe fitting when the securement film is in an uncured state. When the securement film is cured the securement film secures the sealing ring proximate the pipe and the pipe fitting to thereby inhibit or prevent leaks through a primary joint between a pipe and a fitting.

Figure 10:
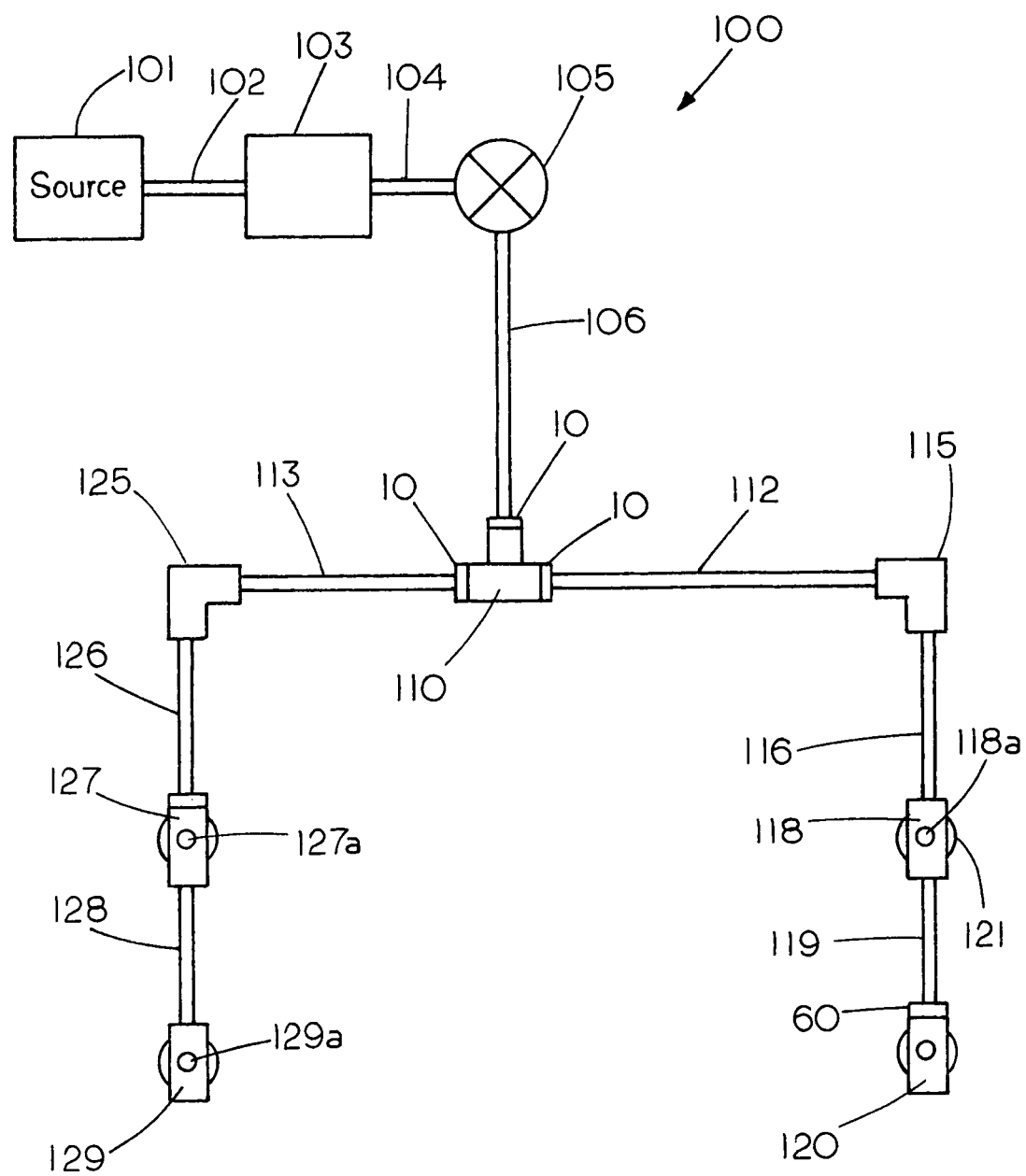
FIG. 10 is a schematic diagram of an irrigation system.

FIG. 10 shows an irrigation water system 100, which may be used to water a lawn or the like. System 100 includes a source of high pressure water 101 that in response to signals from controller 103 directs water to water outlets such as the sprinklers 127, 129 118 and 120 located in the irrigation water system 100. In operation controller 103 allows water to flow through pipe 102 and pipe 104 and check valve 105 into pipe 106 which directs the water to tee 110. Water from tee 110 flows through pipe 112, elbow 115, pipe 116 and pipe 119. A portion of the water flows out sprinkler head 118a of sprinkler 118 and a further portion of water flows out sprinkler head 120a of sprinkler 120.

Similarly, Water from the opposite side of tee 110 flows through pipe 113, elbow 125, pipe 126 and pipe 128. A portion of the water flows out sprinkler head 127a of sprinkler 127 and a further portion of water flows out sprinkler head 129a of sprinkler 129.

Figure 11:
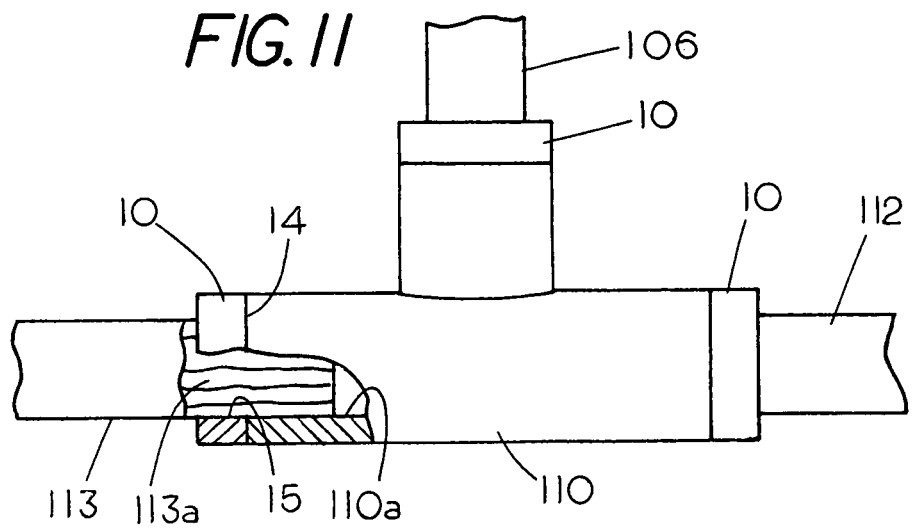
FIG. 11 shows a tee fitting of the system of FIG. 10 with sealing rings forming a secondary joint to primary joints of the tee fitting.

The fittings of irrigation system 100 are shown in greater detail in FIGS. 11-14. FIG. 11 shows Tee 110 with a sealing reinforcement ring 10 located at each of the outlets of the tee 110. Tee 110 has been subjected to a preemptive method of ensuring the integrity of a water supply system 100 by applying a film of sealant 113a to an end surface of a pipe 113 and applying a further film of sealant 113a to a fitting 110 for attachment to the end of the pipe 113. Next one brings the end of the pipe 113 and the fitting 110 into engagement with each other to form a first or primary joint between the pipe 113 and the fitting 110. By applying a further film of sealant to the end of the pipe 11 and to surface 15 of sealing ring or bringing the sealing ring into engagement with the tee before the solvent 113a solidifies one can form the second joint. That is, by bringing the sealing ring 10 into sealing engagement with the fitting 110 one can form a second joint between the pipe 113 and the sealing ring 10 wherein the second joint inhibits or prevents water leakage from the first joint. The process is then repeated to reinforce the primary joints of pipe 106 and tee 110 and pipe 112 and tee 110.

Figure 13:
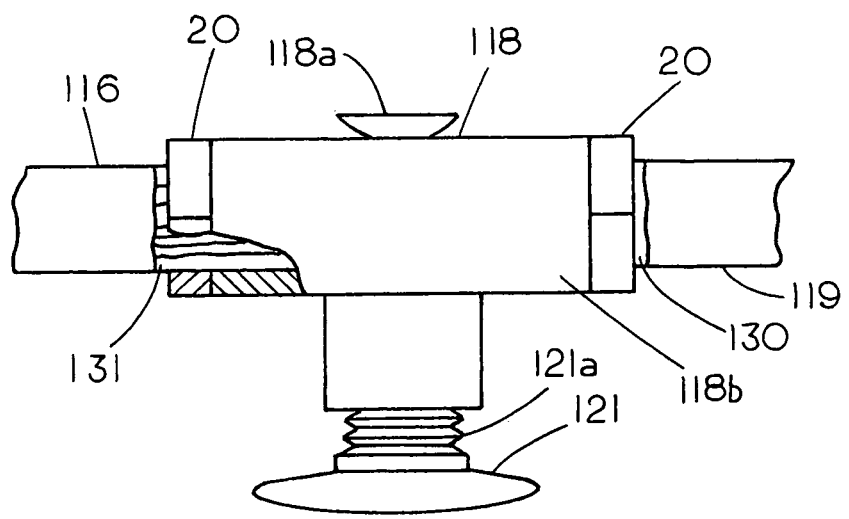
FIG. 13 shows a sprinkler of the system of FIG. 10 with sealing rings forming a secondary joint to the primary joints of the sprinkler valve.

A reference to FIG. 13 shows that each of the outlets of the sprinkler 118 have been reinforced with split rings 20. Sprinkler 118 includes a drain valve 121 that can be rotating engaged with housing 118b which supports a sprinkler head 118a for spraying water onto the soil surrounding the sprinkler 118.

Figure 12:
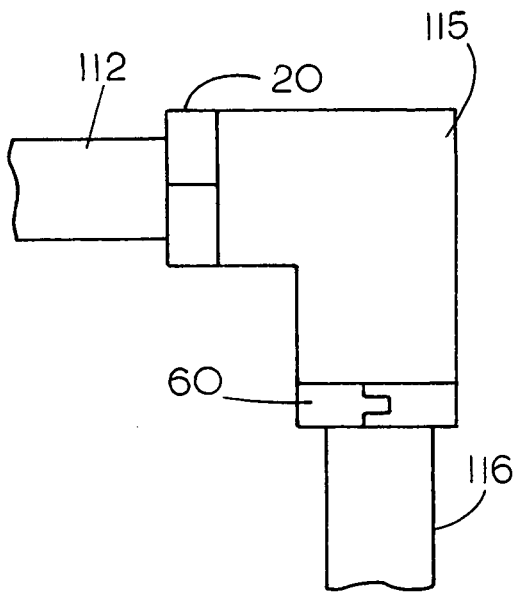
FIG. 12 shows an elbow of the system of FIG. 10 with sealing rings forming a secondary joint to primary joints of the elbow.

FIG. 12 similarly shows a 90 degree elbow 115 wherein the primary seal between pipe 116 and elbow has been reinforced with a split ring 60 as has the primary seal between pipe 112 and elbow 115 reinforced with a split ring seal 20.

As can be seen from FIGS. 10-13 the integrity of the irrigation system 100 can be enhanced by having each of the primary joints between a pipe and a fitting reinforced by use of any either the split sealing rings or the closed sealing rings.

Figure 14:
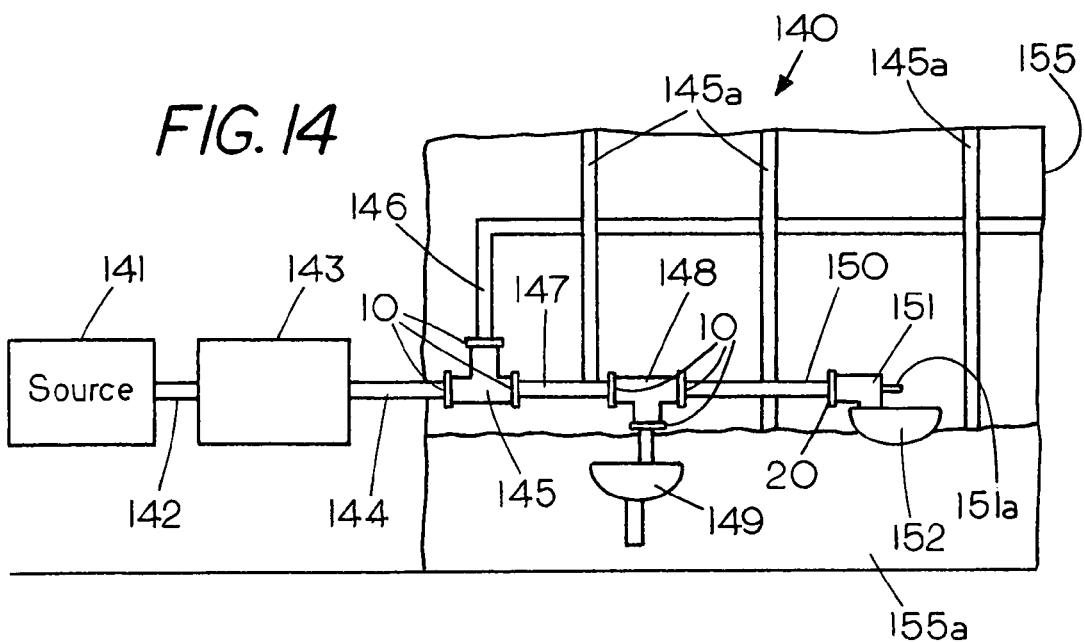
FIG. 14 is a schematic diagram of a building water supply system.

FIG. 14 shows a water system 104, which may be found in a residential or commercial building. System 140 includes a source of high pressure water 141 that directs water to a toilet 149 and a sink 162. That is, water flows through check valve 143 pipe 144, tee 145 pipe 147 and into tee 148 where water can be directed to toilet 149. Water can also be directed to sink 152 through pipe 150 and elbow 151. A faucet handle 151a permits one to direct water into the sink 152. In addition to supplying water to toilet 149 and sink 152 water is direct through pipe 146, which extends through studs 145a of wall 155 to deliver water to another portion of the building. Wall 155 is shown with studs 145a exposed to reveal that the wall board 155a can be placed over the pipes to conceal the pipes from view. With the pipes concealed a leak would be difficulty to repair since it would require removing and replacing the wall board 155a. To preemptively prevent leakage each of the joints between a fitting and a pipe may be reinforced prior to sealing the water lines in the wall.

Figure 15:
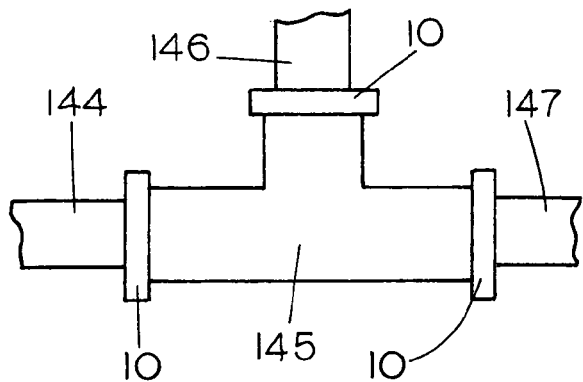
FIG. 15 shows a tee fitting of the system of FIG. 14 with sealing rings forming a secondary joint to primary joints of the tee fitting.
Figure 16:
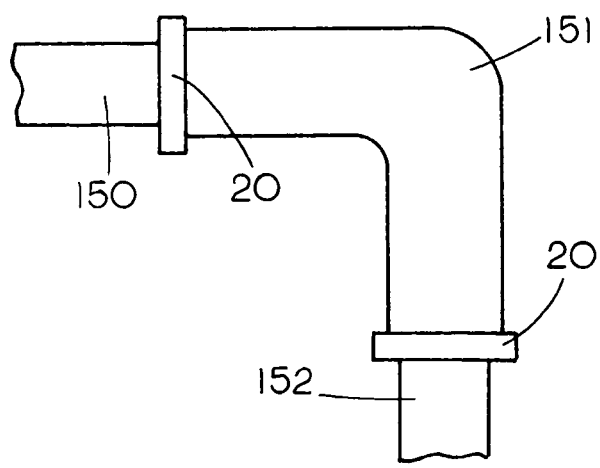
FIG. 16 shows an elbow of the system of FIG. 14 with sealing rings forming a secondary joint to primary joints of the elbow.

FIG. 15 shows that tee 145 each of the primary joints between the tee 145 and the pipe has been reinforced with a closed sealing ring 10. Similarly FIG. 16 shows that the primary joints between pipe 150 and elbow 151 and the primary joint between pipe 152 and elbow 151 have been reinforced by a split sealing ring 20.

Thus the invention provides a low cost method and a system for inhibiting or preventing leaks since the sealing ring has low material costs and can be applied when the primary joint is formed between the fitting and the pipe thereby saving labor costs that would occur if the system was repaired after the system has been placed into use through use of a sealing member for leak proofing a joint between a pipe and a fitting. As illustrated in FIG. 1 the sealing member comprises an inner surface 15 on the sealing member for engaging with a circumferential surface of the pipe proximate the fitting 30, an outer grasping surface 11 on the sealing member and a sealant 31t on the inner surface for sealingly securing the sealing member to the pipe to prevent leakage between the pipe and the fitting. While the invention has been described with use of sealing joints with PVC pipes the invention may be used for sealing leaks in pipes made from materials other than PVC.

We claim:

1. A preemptive method of ensuring the integrity of a water supply system comprising the steps:
    securing a cylindrical interior surface of a fitting to a cylindrical exterior surface of a pipe having a sealant thereon by inserting the cylindrical exterior surface of the pipe into the fitting to form a primary annular joint between the cylindrical exterior surface of the pipe and the cylindrical interior surface of the fitting;

sliding a sealing member having an inner annular surface along the sealant on the exterior surface of the pipe that forms the primary annular joint with the fitting to bring an annular end face of the sealing member in face-to-face sealing engagement with an annular end face of the fitting and the inner annular surface of the sealing member into engagement with the cylindrical exterior surface of the pipe proximate the annular end face of the fitting to form a secondary joint between the pipe and the fitting with the secondary joint on the inner annular surface of the sealing member being in cylindrical alignment and in series with the primary joint so that if a leak should occur in the primary joint the secondary joint inhibits or prevents water leakage therefrom; and concealing the primary joint between the pipe and the fitting after securing the sealing member thereto.

2. The method of claim 1 including the step of applying a sealant to an end face of the sealing ring and an end face of the fitting wherein the step of bringing the sealing member face-to-face with an end face of the fitting is formed without knowing if the primary joint is faulty.

3. The method of claim 1 wherein the primary joint is concealed either by soil or by a building wall.

4. The method of claim 1 wherein the sealing member is applied to an irrigation pipe.

5. The method of claim 1 wherein the sealing member is applied to a water pipe of either a residential or commercial building.

6. The method of claim 4 wherein the sealing member is slid axially into an abutting engagement with the fitting to form the second sealed joint between an end face of the sealing member and an end face of the fitting.

7. The method of claim 1 wherein the sealant is applied to an exterior surface of the end of the pipe and to an interior surface of the sealing member.

8. The method of claim 1 wherein said sealing member is a split sealing ring.

* * * * *